United States Patent
Nannen et al.

(10) Patent No.: US 10,862,416 B2
(45) Date of Patent: Dec. 8, 2020

(54) METHOD FOR ALIGNING A THREE-PHASE MACHINE HAVING SOFT START AND THREE-PHASE MACHINE

(71) Applicant: SIEMENS AKTIENGESELLSCHAFT, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/342,444

(22) PCT Filed: Oct. 17, 2016

(86) PCT No.: PCT/EP2016/074880
§ 371 (c)(1),
(2) Date: Apr. 16, 2019

(87) PCT Pub. No.: WO2018/072810
PCT Pub. Date: Apr. 26, 2018

(65) Prior Publication Data
US 2020/0059183 A1    Feb. 20, 2020

(51) Int. Cl.
*H02P 21/00* (2016.01)
*H02P 21/09* (2016.01)
(Continued)

(52) U.S. Cl.
CPC .............. *H02P 21/09* (2016.02); *H02P 21/22* (2016.02); *H02P 21/34* (2016.02)

(58) Field of Classification Search
CPC .. H02P 21/34; H02P 6/18; H02P 21/22; H02P 25/089; H02P 6/20
See application file for complete search history.

(56) References Cited

U.S. PATENT DOCUMENTS

2015/0022959 A1* 1/2015 Sun .................. H05K 7/00
                                                                361/679.01
2015/0180377 A1 6/2015 Hua et al.

FOREIGN PATENT DOCUMENTS

| DE | 102010008814 A1 | 8/2011 |
| DE | 102010030239 A1 | 12/2011 |
| WO | WO 2006/034977 A1 | 4/2006 |

OTHER PUBLICATIONS

International Search Report issued by the European Patent Office in International Application PCT/EP2016/074880.
(Continued)

*Primary Examiner* — Karen Masih
(74) *Attorney, Agent, or Firm* — Henry M. Feiereisen

(57) ABSTRACT

In order to achieve the energy efficiency class IE4 defined in the IEC standard 60034, it is necessary to operate permanently excited synchronous machines directly on the mains. Because this is not readily possible, soft start devices may be considered as cost-efficient solutions. A method is described by which the initial rotor angle is defined, which can then be used by an encoderless start process. The fundamental concept is based on energizing in a defined direction. This is achieved in that solely two actuator phases are fired. A current space vector is thereby applied to the machine in a fixed direction and the machine is then aligned thereto. The successful alignment and a blocked motor can thus be recognized based on the profile of the stator current space vector.

6 Claims, 5 Drawing Sheets

(51) Int. Cl.
*H02P 21/22* (2016.01)
*H02P 21/34* (2016.01)

(56) References Cited

OTHER PUBLICATIONS

Hauke Nannen & Heiko Zatocil: "Initial Rotor Position Determination of a Soft Starter Driven Synchronous Motor". VDE Conference, May 16, 2017, the whole document.
Benecke Marcel: "Anlauf von energieeffizienten Synchronmaschinen mit Drestromsteller", XP055392434, Found in the Internet: URL: http://d-nb.info/1054135258/34, [found Jul. 20, 2017], the whole document; 2012.

\* cited by examiner

METHOD FOR ALIGNING A THREE-PHASE MACHINE HAVING SOFT START AND THREE-PHASE MACHINE

CROSS-REFERENCES TO RELATED APPLICATIONS

This application is the US. National Stage of international Application No. PCT/EP2016/074880, filed Oct. 17, 2016, which designated the United States and has been published as international Publication No. WO 2018/072810.

BACKGROUND OF THE INVENTION

A three-phase machine converts mechanical energy into three-phase current or three-phase current into mechanical energy. In principle, it can be operated as an electrical generator or as an electric motor. Measures for power limitation during switch-on of an electrical device, for example an electric motor, are referred to as soft starting.

In accordance with IEC standard 60034, three-phase machines are divided in terms of their efficiency into different energy efficiency classes. Even in the lower power range up to approximately 20 kW, the legislative efficiencies for electric drives can only be adhered to with difficulty, for which reason increasingly the use of permanent magnets in the rotor is desired, for example as a permanent magnet synchronous machine (PMSM).

FIG. 1 shows a schematic illustration of such a permanent magnet synchronous machine in an embodiment as a revolving-field machine comprising a stator St and a rotor L. The rotor comprises a magnetic north pole N and south pole S and winding phases U, V, W. The Illustration should be understood merely by way of example and does not have any restrictive effect on the scope of protection of the claimed subject matter.

This type of machine does provide the possibility of high degrees of energy efficiency, but starting and operation on the stiff power supply system are not readily possible.

In order to make this possible, a squirrel-cage damper winding can be provided in the rotor of the machine, said squirrel-cage damper winding enabling safe ramp-up on the stiff power supply system but subjecting the feed power supply system to severe loads owing to very high starting currents.

Likewise, operation using a suitable power electronics actuator, such as, for example, a frequency converter or soft starter, is possible. In this case, in particular the use of a soft starter represents a cost-friendly solution to the ramp-up of a permanent magnet synchronous machine on the stiff power supply system. At present, there is as yet no market-ready solution known for this, however.

In the dissertation by Dr. Marcel Bennecke (University of Magdeburg) entitled "Anlauf von energieeffizienten Synchronmaschinen mit Drehstromsteller" [Starting of energy-efficient synchronous machines using a three-phase power controller], a solution to the ramp-up of the permanent magnet synchronous machine using a soft starter is proposed. The method proposed in this work does require the present rotor angle of the machine, however, with the result that the motors used for the work need to be equipped with a corresponding sensor system. A sensor is understood to mean speed sensors and position sensors. These sensors detect the mechanical variables of speed and position. Their signals are necessary for supplying actual values to the closed-loop controllers and for closing the existing position and speed control loops. The position and speed signals also act as an important input variable for the current control loop for the vectoral closed-loop control methods in three-phase drives. The sensor in this case detects the speed and/or position directly on the motor shaft.

The sensor system does, however, have a negative effect on the costs and availability of the system, which at present makes a soft start solution for high-efficiency motors unattractive.

The object of the invention consists in specifying a method for running up a permanent magnet synchronous machine without sensors. A further object of the invention consists in specifying a permanent magnet synchronous machine without sensors which operates using the method according to the invention.

SUMMARY OF THE INVENTION

The required starting method differs from the sensorless methods known from the prior art in that it needs to be usable for a thyristor controller and not a frequency converter. Therefore, these known methods are not applicable.

The problems with sensorless ramp-up can be divided into two subproblems: determination of the initial rotor angle; ramp-up of the machine.

DETAILED DESCRIPTION OF PREFERRED EMBODIMENTS

The claimed method shows how the initial rotor position can be established so that ramp-up without sensors is possible.

In the initial state of the system, the electrical position of the machine is unknown and needs to be determined or established. For this purpose, pulsating currents in a defined direction are applied to the machine, and said machine is aligned in a clear direction by virtue of these currents. Likewise, the current characteristic is analyzed, with the result that it is possible to determine whether the machine is moving at all. The individual steps will be explained in more detail below.

Throughout the process, only ever two valves 6, 7, 8, consisting of two thyristors A1, A2; B2; C1, C2 connected back-to-back in parallel, are fired, with the result that current flows through only two motor phases. The third phase does not conduct any current since the corresponding valve is off. Consequently, it holds true for this state that the two phases through which current flows conduct the same current, in terms of absolute value, but with different mathematical signs. This means that the current space vector in the stator-fixed coordinate system can only extend on three fixed axes, and the current space vector length changes as a function of time.

Figure 1:
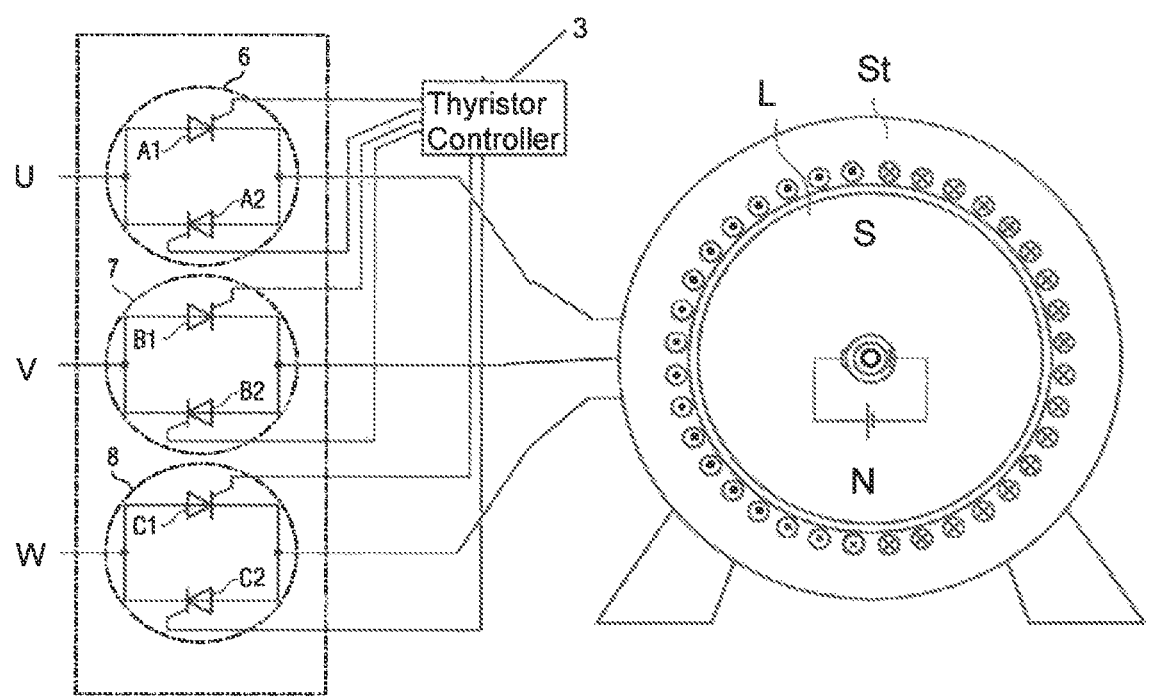
FIG. 1 shows a section through an exemplary three-phase machine.
Figure 2:
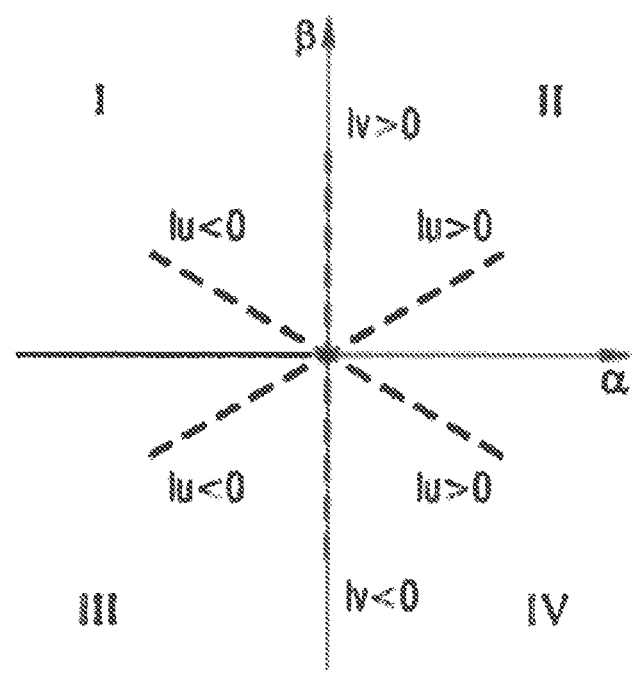
FIG. 2 shows a graph of the current direction with discrete current space vectors.

If the current direction is taken into consideration, in total 6 discrete current space vectors are possible; see FIG. 2.

In quadrant I phases V and W are fired, in quadrant II phases U and W are fired, and in quadrant IV phases U and V are fired.

Owing to the current flow in one of the six possible directions, a field aligned in the same way is built up in the machine. If the flux axis of the machine is not in this direction determined by the current, a torque is produced, and the machine begins to rotate in the direction of the stator current space vector, i.e. it automatically aligns itself in the current direction. As soon as the flux axis of the machine coincides with the current direction, torque is no longer produced.

Determination of the Optimum Firing Angle:

In order to ensure that the alignment of the machine is performed with a fixed maximum current (and therefore also with a maximum torque), first the optimum firing angle needs to be determined. This is used in all further alignment operations.

For this purpose, at step S10, two thyristors are fired only once at a very large firing angle (for example 180°), and the amplitude value of the phase currents is determined, at step S11. Owing to the large firing angle, the voltage-time integral effective across the machine and therefore the maximum of the resultant current are very low. If the current amplitude is lower than a defined maximum value, the firing angle of the thyristor controller 3 is reduced slowly from 180°, for example, and the current amplitude value is again compared with the maximum value, at step S12.

This operation is repeated until the amplitude value is sufficiently close to the maximum value.

In all further measurements, the amplitude value of the currents needs to be monitored continuously and, if appropriate, the optimum firing angle needs to be adjusted again. By way of simplification, it is presupposed below that this is not necessary.

In this case, a calculation can be as follows:

Phases U and V are fired, and the current in phase U is positive. Thus, the angle in the vector is −30°.

When applying the Clarke/Park transformation with the electrical angle of the machine φ, the current $I_q$ forming the torque can be calculated:

$$I_q(t) = \frac{2}{3} \cdot \left[ -I_U(t) \cdot \sin\varphi - I_V(t) \cdot \sin\left(\varphi - \frac{2\pi}{3}\right) - I_W(t) \cdot \sin\left(\varphi + \frac{2\pi}{3}\right) \right]$$

$$= -\frac{2}{\sqrt{3}} \cdot I_U(t) \cdot \cos\left(-\varphi + \frac{\pi}{3}\right)$$

Consequently, the torque is calculated as ($L_d = L_q$):

$$M(t) = \frac{2}{3} \cdot p \cdot \psi_d \cdot I_q(t)$$

$$= -\frac{4}{3 \cdot \sqrt{3}} \cdot p \cdot \psi_d \cdot I_U(t) \cdot \cos\left(-\varphi + \frac{\pi}{3}\right)$$

The torque becomes 0 when the electrical angle=−30°.

First Alignment:

During the determination of the optimum firing angle, the machine has already been able to align itself on the basis of the pulsating currents. However, this does not yet ensure that the machine is already completely aligned. For this reason, the thyristors are again fired a plurality of times (the number can be calibrated) with the determined optimum firing angle, with the result that, at the end, it can be assumed that the machine is no longer moving and is therefore aligned, at step S13. Finally, the characteristic of the phase current during a firing operation is recorded and is used as reference course in the subsequent measurements, at step S14.

Second Alignment (Plausibility Check):

After the first alignment, it is necessary to ensure that, firstly, the machine can actually move freely and, secondly, it is actually aligned in the current direction and not offset through precisely 180°. For this purpose, the above-described method is repeated with the same optimum firing angle, but in a different current direction, at step S15.

If, therefore, until now phases U and V have always been fired, for example, phases V and W are now fired. In this case, the phase sequence can be selected such that the motor rotates in the positive direction of rotation and there is no possible damage to the mechanism since this rotates in the opposite direction to the permitted direction of rotation during the alignment.

Whereas now a pulsating current space vector in a different direction is applied to the machine, the measured course of the stator phase current is compared with the reference course from the first alignment, at step S16. If the characteristics are very similar, at step S17, the motor does not move and a corresponding message ("motor blocked") is output—the alignment operation cannot be concluded and is therefore terminated in order to protect the system at step S18.

This can be expressed by comparing the phase current $I_{ij}^{\varphi 1n}(k)$ for the phase U from the first alignment with the phase current $I_{ij}^{\varphi 21n}(k)$ for the second current angle measured as a function of time (or another time-dependent variable k). A first indicator is established by calculating the sum of error squares. When this sum is greater than a threshold value $\varepsilon_{block}$, the motor is blocked:

$$\Sigma[I_{ij}^{\varphi 1n}(k) - I_{ij}^{\varphi 21}(k)]^2 > \varepsilon_{block}.$$

If the machine realigns itself corresponding to the new angle of the current space vector, the current characteristics are different. The same thyristors are now fired again a plurality of times in order to ultimately align the machine, at step S20. At the end of this operation, the course of the stator phase current is again compared with the reference course, at step S21, by comparing the phase current $I_{ij}^{\varphi 1n}(k)$ for the phase U from the first alignment with the phase current $I_{ij}^{\varphi 2n}(k)$ for the second current angle measured after alignment as before as a function of time (or another time-dependent variable k). A second indicator is established by calculating the sum of error squares. When this sum is smaller than or equal to a threshold value $\varepsilon_{finish}$, i.e.

$$\Sigma[I_{ij}^{\varphi 1n}(k) - I_{ij}^{\varphi 2n}(k)]^2 \leq \varepsilon_{finish}.$$

meaning that if the courses of the stator phase currents are very similar, at step S22, the machine no longer moves and the machine is aligned, at step S19.

If the courses of the phase currents still differ markedly from one another, the method can be repeated or an error message is output in order to protect the machine from mechanical damage, at step S23.

Figure 3:
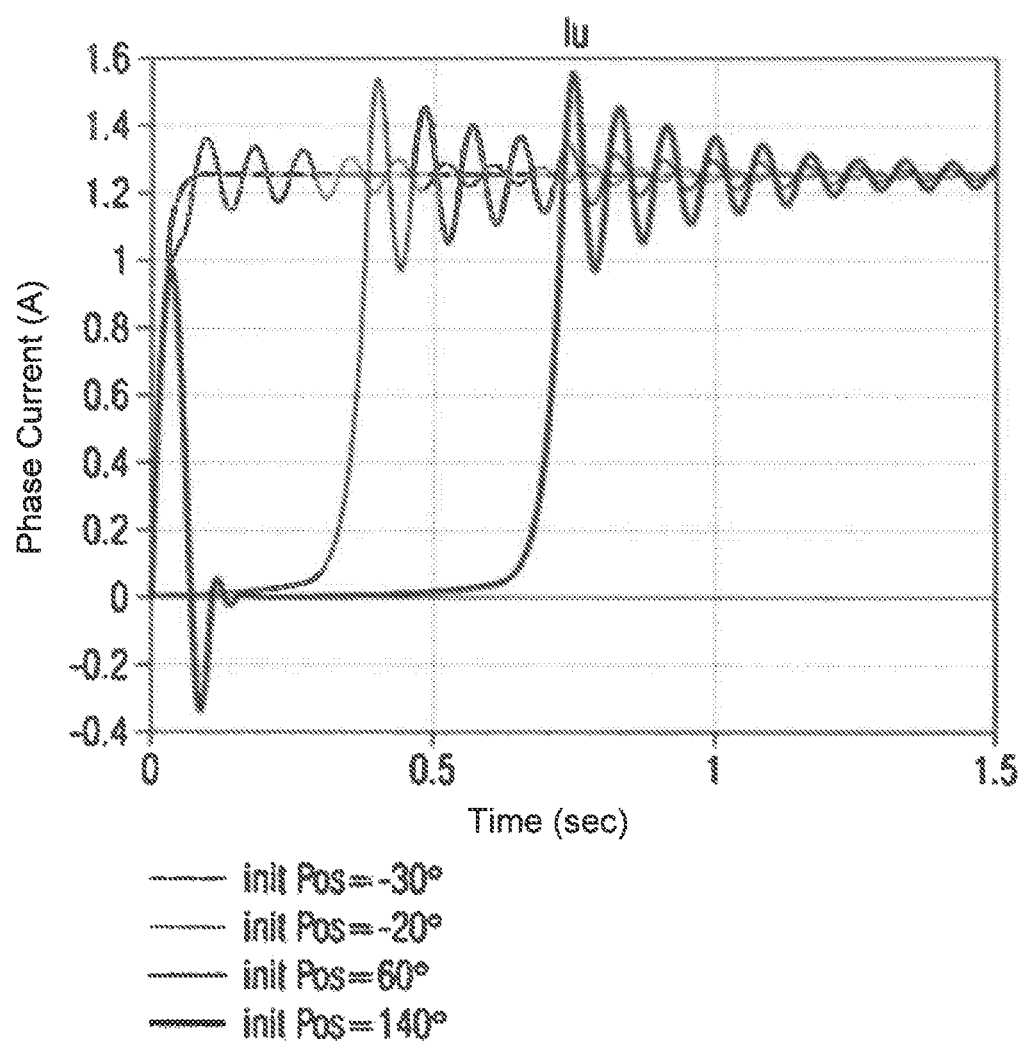
FIG. 3 shows a simulated current characteristic in phase U.
Figure 4:
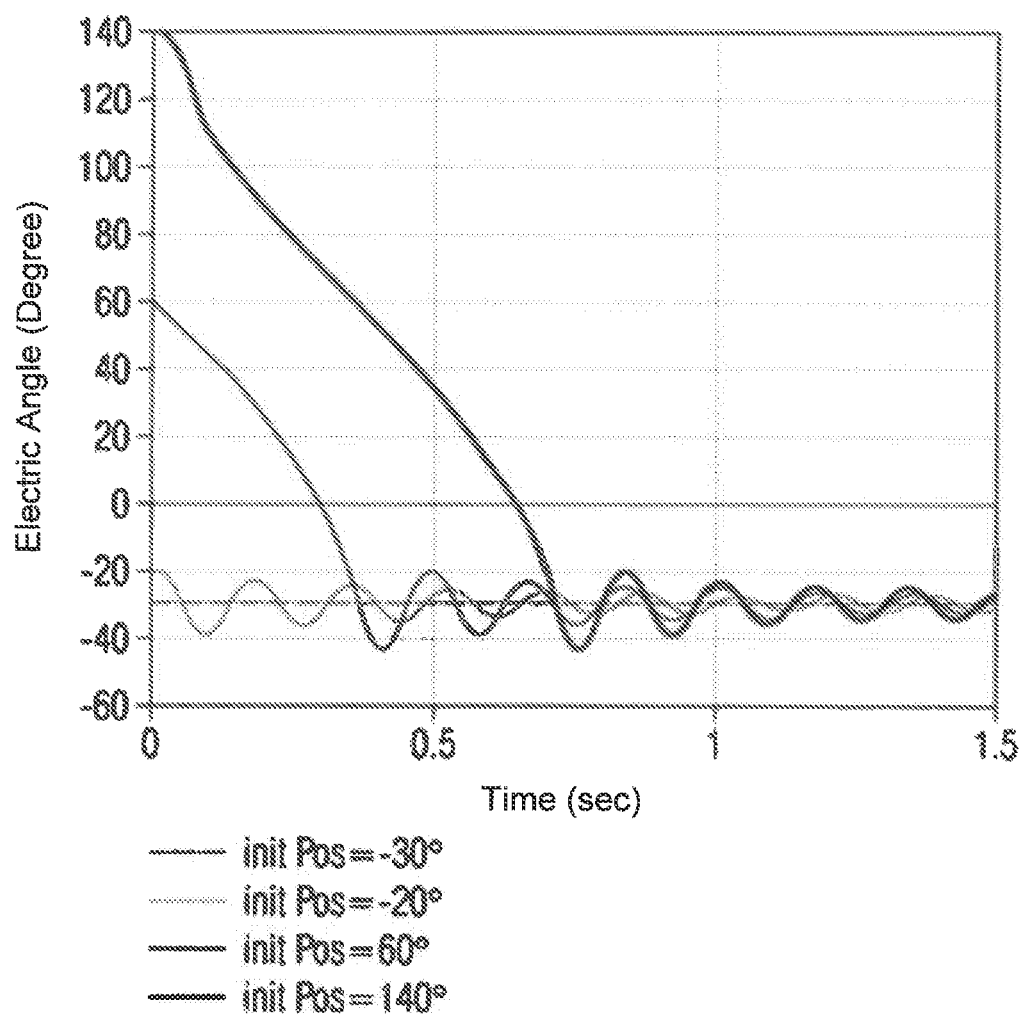
FIG. 4 shows an exemplary characteristic of the electrical angle during the alignment operation given different starting angles.
Figure 5:
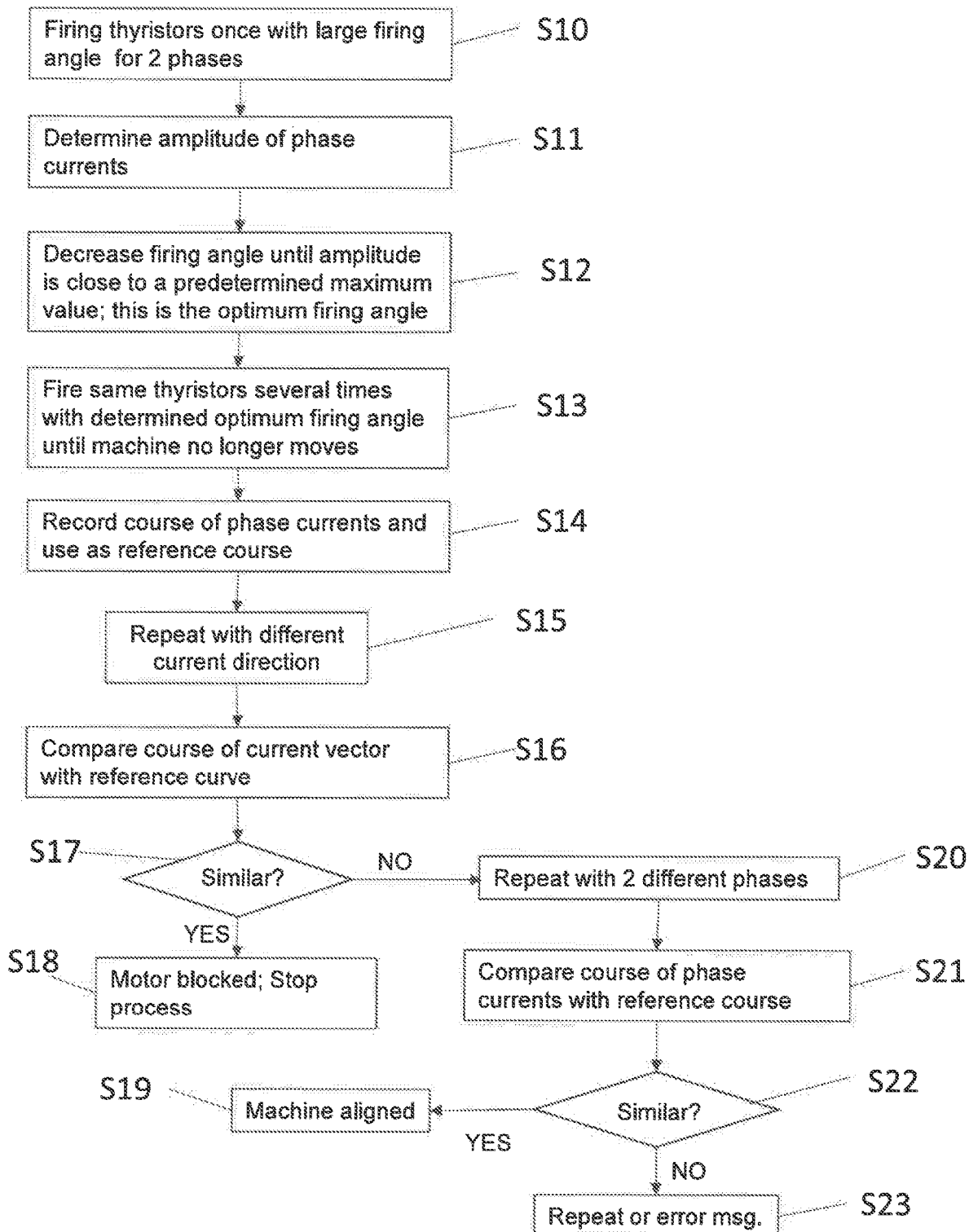
FIG. 5 shows a flow char depicting the method of the present invention.

Current Characteristic (Simulated):

FIGS. 3 and 4 show, by way of example, the simulated characteristic of the phase current in phase U and the characteristic of the electrical angle during the alignment operation given different starting angles.

In the simulation, by way of simplification, a DC voltage was applied to the machine, but the basic assertions also apply to excitation using a thyristor controller.

It becomes clear that, given a starting angle of φ=−30°, the machine is already aligned and the current characteristic is determined purely by the resistance and the inductance of the machine (RL path). As the initial angle of the machine increases, the current characteristic deviates markedly from this simple RL response. The reason for this is the voltages induced by the movement of the machine which influence the current shape—the characteristic of the current can therefore be used for the plausibility check ("is the machine moving?").

Current Characteristic (Measured):

The simulated current characteristic on DC energization has been verified using a real machine in a laboratory. The starting angles have been estimated roughly with the following values:

| Channel | Electrical starting angle in ° |
|---------|-------------------------------|
| R1      | 0                             |
| R2      | −45                           |
| R3      | −85                           |
| R4      | −125                          |
| CH1     | −175                          |

The described starting method differs from the known sensorless methods in that it needs to be usable for a thyristor controller and not a frequency converter. This has the direct consequence that a method with test signal injection at low speeds owing to the hardware topology cannot be realized—the known methods are not transferable to the present application case.

What is claimed is:

1. A method for aligning an encoder-less three-phase machine having a soft start feature, comprising:
   a) firing antiparallel thyristors of two motor phases of the encoder-less three-phase machine in a first current direction with an initial large firing angle,
   b) measuring an amplitude of phase currents,
   c) decreasing the initial large firing angle until the measured amplitude of the phase currents approximates a predetermined maximum amplitude, with the decreased firing angle at the predetermined maximum amplitude representing an optimum firing angle of the antiparallel thyristors in the first current direction,
   d) aligning the encoder-less three-phase machine with the two motor phases by using the previously determined optimum firing angle,
   e) recording a course of the phase currents as a function of time as a reference course, and
   f) energizing two different motor phases using the previously determined optimum firing angle and checking the alignment of the rotor in the second current direction by comparing a second course of the phase currents of the two different motor phases with the reference course over time and confirming that the encoder-less three-phase machine is aligned when a sum of error squares between the second course and the reference course is less than or equal to a first predetermined threshold value.

2. The method of claim 1, wherein a first phase current of the two motor phases has a current flow of Identical absolute value, but of opposite mathematical sign as a second phase current of the two motor phases.

3. The method of claim 1, further comprising firing the antiparallel thyristors of the two motor phases at least one more time until the measured amplitude is close to the predetermined maximum amplitude.

4. The method of claim 1, further comprising recording the reference course while the antiparallel thyristors of the two motor phases are fired and using the recorded reference course in subsequent measurements.

5. The method of claim 1, further comprising
   after step e) measuring the course of the phase currents at the optimum firing angle in a different second current direction,
   comparing the course of the the phase currents in the different second current direction with the reference course, and
   outputting an error message when a sum of error squares between the course in the second current direction and the reference course is greater than a predetermined second threshold value.

6. An encoder-less three-phase machine having a soft start feature, comprising:
   a rotor,
   two antiparallel thyristors energizing two motor phases of the encoder-less three-phase machine, and
   a thyristor controller configured to
   determine an optimum firing angle of the two antiparallel thyristors in a first current direction to define a first alignment of a rotor of the encoder-less three-phase machine, with the optimum firing angle being determined by decreasing, with the thyristor controller, an initial large firing angle until a measured amplitude of phase currents approximates a predetermined maximum amplitude,
   align the rotor with the first alignment by using only the two motor phases of the encoder-less three-phase machine and the previously determined optimum firing angle,
   record a course of the phase currents as a reference course,
   energize two different motor phases using the previously determined optimum firing angle, and
   checking the alignment of the rotor in the second current direction by comparing a second course of the current space vector in the two different motor phases with the reference course over time and confirming that the encoder-less three-phase machine is aligned when a sum of error squares between the second course and the reference course is less than or equal to a first redetermined threshold value.

* * * * *